United States Patent
You et al.

(10) Patent No.: US 12,231,205 B2
(45) Date of Patent: Feb. 18, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Xin You, Dongguan (CN); Cong Shi, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 303 days.

(21) Appl. No.: 17/579,924

(22) Filed: Jan. 20, 2022

(65) Prior Publication Data
US 2022/0149923 A1    May 12, 2022

Related U.S. Application Data

(63) Continuation of application No. PCT/CN2019/097788, filed on Jul. 25, 2019.

(51) Int. Cl.
| | |
|---|---|
| *H04B 7/06* | (2006.01) |
| *H04L 5/00* | (2006.01) |
| *H04W 72/1263* | (2023.01) |
| *H04W 72/21* | (2023.01) |
| *H04W 72/23* | (2023.01) |
| *H04W 72/56* | (2023.01) |

(Continued)

(52) U.S. Cl.
CPC ......... *H04B 7/0695* (2013.01); *H04L 5/0051* (2013.01); *H04W 72/1263* (2013.01); *H04W 76/19* (2018.02); *H04W 80/02* (2013.01)

(58) Field of Classification Search
CPC ...... H04B 7/0695; H04B 7/063; H04B 7/088; H04B 7/061; H04L 5/0051; H04L 5/001; H04W 72/1263; H04W 76/19; H04W 80/02; H04W 76/15; H04W 72/23; H04W 72/56; H04W 76/18; H04W 72/21
See application file for complete search history.

(56) References Cited

U.S. PATENT DOCUMENTS

| | | | |
|---|---|---|---|
| 2019/0052339 A1* | 2/2019 | Zhou | H04W 52/50 |
| 2020/0145083 A1* | 5/2020 | John Wilson | H04W 74/08 |

(Continued)

FOREIGN PATENT DOCUMENTS

| | | |
|---|---|---|
| CN | 109699034 A | 4/2019 |
| CN | 109906578 A | 6/2019 |

(Continued)

OTHER PUBLICATIONS

Priority Review issued in corresponding Chinese application No. 202111585072.3, mailed Mar. 27, 2023.
(Continued)

*Primary Examiner* — Harry H Kim
(74) *Attorney, Agent, or Firm* — BAYES PLLC (57) ABSTRACT

A wireless communication method, a terminal device and a network device. The method includes sending, by a terminal device, a Media Access Control (MAC) Control Element (CE) to a network device, wherein the MAC CE is used to indicate beam failure information corresponding to each secondary cell in at least one secondary cell.

14 Claims, 5 Drawing Sheets

(51) Int. Cl.
*H04W 76/15* (2018.01)
*H04W 76/18* (2018.01)
*H04W 76/19* (2018.01)
*H04W 80/02* (2009.01)

(56) References Cited

U.S. PATENT DOCUMENTS

| | | | | |
|---|---|---|---|---|
| 2021/0013948 | A1* | 1/2021 | Agiwal | H04L 45/28 |
| 2021/0028849 | A1* | 1/2021 | Chin | H04B 7/06964 |
| 2021/0314051 | A1* | 10/2021 | Yang | H04L 5/001 |
| 2022/0007433 | A1* | 1/2022 | Liu | H04W 74/0833 |
| 2022/0256562 | A1* | 8/2022 | Behravan | H04W 72/569 |
| 2022/0264595 | A1* | 8/2022 | Xiao | H04W 72/569 |
| 2022/0271817 | A1* | 8/2022 | Lee | H04B 7/0617 |
| 2024/0236722 | A1* | 7/2024 | Yuan | H04B 7/0639 |

FOREIGN PATENT DOCUMENTS

| | | |
|---|---|---|
| CN | 110012549 A | 7/2019 |
| CN | 110022613 A | 7/2019 |
| CN | 110034799 A | 7/2019 |
| CN | 110035502 A | 7/2019 |
| EP | 3675578 A1 | 7/2020 |
| EP | 3716713 A1 | 9/2020 |
| WO | 2018227441 A1 | 12/2018 |
| WO | 2019032882 A1 | 2/2019 |
| WO | 2019/135654 A1 | 7/2019 |
| WO | 2019137472 A1 | 7/2019 |

OTHER PUBLICATIONS

First Office Action issued in corresponding European application No. 19938867.9, mailed Mar. 21, 2023.
First Office Action issued in corresponding Japanese application No. 2022-504234, mailed Apr. 4, 2023.
MediaTek Inc., "Discussion on sidelink physical layer structure", R1-1906553, 3GPP TSG RAN WG1 #97 Reno, USA, May 13-17, 2019.
MediaTek Inc., "Enhancements on multi-beam operations", R1-1904476, 3GPP TSG RAN WG1 #96bis Xi'an, China, Apr. 8-12, 2019.
Huawei et al., "RACH design for IAB", R1-1903937, 3GPP TSG RAN WG1 Meeting #96bis Xi'an, China, Apr. 8-12, 2019.
Huawei et al., "Beam failure recovery for SCell", R1-1903093, 3GPP TSG RAN WG1 Meeting #96 Athens, Greece, Feb. 25-Mar. 1, 2019.
Huawei et al., "Beam failure recovery for Scell", R1-1900846, 3GPP TSG RAN WG1 Ad-Hoc Meeting 1901 Taipei, Jan. 21-25, 2019.
Samsung, "Contention Based BFR Procedure: Reporting Candidate Beam", R2-1804304, 3GPP TSG-RAN2 101bis Sanya, China, Apr. 16-Apr. 20, 2018.
International Search Report issued in corresponding International Application No. PCT/CN2019/097788, mailed Apr. 23, 2020, 30 pages.
Written Opinion of the International Searching Authority issued in corresponding International Application No. PCT/CN2019/097788, mailed Apr. 23, 2020, 7 pages.
"Beam failure recovery for SCell", Agenda item: 10.3.1.13, Source: Huawei, HiSilicon, 3GPP TSG-RAN WG2 #101 R2-1801814, Athens, Greece, Feb. 26-Mar. 2, 2018, 2 pages.
"SCell Beam Failure Recovery", Agenda item: 10.3.1.4.2, Source: Nokia, Nokia Shanghai Bell, 3GPP TSG-RAN WG2 Meeting #101bis R2-1805342, Sanya, China, Apr. 16-20, 2018, 3 pages.
"SCell Beam Failure Recovery", Agenda item: 10.3.1.4.2, Source: Nokia, Nokia Shanghai Bell, 3GPP TSG-RAN WG2 Meeting #102 R2-1808024, Busan, South Korea, May 21-25, 2018, 2 pages.
Extended European Search Report issued in corresponding European application No. 19938867.9, mailed Jul. 8, 2022.
First Office Action issued in corresponding Indian application No. 202217009962, mailed Jul. 22, 2022.
Samsung Electronics, "CSI RS Beam Reporting during CB BFR", R2-1806831, 3GPP TSG-RAN2 102 Busan, South Korea, May 21-May 25, 2018.
First Office Action issued in corresponding Chinese application No. 202111585072.3, mailed Apr. 19, 2023.
Second Office Action issued in corresponding Chinese application No. 202111585072.3, mailed Jul. 14, 2023.
Second Office Action issued in corresponding Japanese application No. 2022-504234, mailed Jul. 18, 2023.
Second Office Action issued in corresponding European application No. 19938867.9, mailed Aug. 10, 2023.
3GPP TSG RAN WG1 #97; R1-1906537; Reno, USA, May 13-17, 2019 Source: MediaTek Inc.; Title: Enhancements on multi-beam operations.
3GPP TSG RAN WG1 Meeting #96bis; R1-1903977; Xi'an, China, Apr. 8-12, 2019 Source: Huawei, HiSilicon; Title: Beam failure recovery for SCell.
3GPP TSG-RAN WG1 Meeting #96-Bis; R1-1905073; Xi'an, China, Apr. 8-12, 2019 Source: Asia Pacific Telecom; Title: Enhancements on Multi-beam Operations.
3GPP TSG RAN WG1 #96bis; R1-1904241; Xi'an, China, Apr. 8-12, 2019 Source: Sony; Title: Enhancements on multi-beam operation.
Third Office Action issued in corresponding European application No. 19938867.9, mailed Feb. 9, 2024.
Decision of Rejection issued in corresponding Chinese application No. 202111585072.3, mailed Oct. 16, 2023.
Notice of Allowance issued in corresponding Japanese application No. 2022-504234, mailed Nov. 10, 2023.

* cited by examiner

Send, by a terminal device, a Media Access Control (MAC) Control Element (CE) to a network device, wherein the MAC CE is used to indicate beam failure information corresponding to each secondary cell in at least one secondary cell — S210

Receive, by a network device, a Media Access Control (MAC) Control Element (CE) sent from a terminal device, wherein the MAC CE is used to indicate beam failure information corresponding to each secondary cell in at least one secondary cell — S310

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2019/097788 filed on Jul. 25, 2019, entitled "Wireless Communication Method, Terminal Device and Network Device," the contents of which are incorporated herein by reference in its entirety.

TECHNICAL FIELD

Embodiments of the present disclosure generally relate to communication technologies, and more particularly, to a wireless communication method, a terminal device and a network device.

BACKGROUND

In communication systems, a terminal device can establish a connection with a Primary Cell (PCell) and at least one Secondary Cell (SCell). When a beam failure occurs on the PCell, for example, when the quality of a signal transmitted by the beam is lower than a certain threshold, the terminal device can initiate a Beam Failure Recovery (BFR) procedure to switch to a new beam for data transmission. Specifically, the terminal device can report the beam failure information to the network through a random access procedure. However, for the secondary cell, when BFR occurs, how to perform a fast BFR is a problem that needs to be solved urgently.

SUMMARY

Embodiments of the present disclosure provide a wireless communication method, a terminal device and a network device, which are conducive to realizing fast BFR for a secondary cell.

According to a first aspect, there is provided a wireless communication method, including:

sending, by a terminal device, a Media Access Control (MAC) Control Element (CE) to a network device, wherein the MAC CE is used to indicate beam failure information corresponding to each secondary cell in at least one secondary cell.

According to a second aspect, there is provided a wireless communication method, including:

receiving, by a network device, a Media Access Control (MAC) Control Element (CE) sent from a terminal device, wherein the MAC CE is used to indicate beam failure information corresponding to each secondary cell in at least one secondary cell.

According to a third aspect, there is provided a terminal device configured to perform the method according to the first aspect or any implementation of the first aspect. Specifically, the terminal device includes units configured to perform the method according to the first aspect or any implementation of the first aspect.

According to a fourth aspect, there is provided a network device configured to perform the method according to the second aspect or any implementation of the second aspect. Specifically, the network device includes units configured to perform the method according to the second aspect or any implementation of the second aspect.

According to a fifth aspect, there is provided a terminal device including a processor and a memory configured to store a computer program, wherein the processor is used to call and run the computer program stored in the memory to perform the method according to the first aspect or any implementation of the first aspect.

According to a sixth aspect, there is provided a network device including a processor and a memory configured to store a computer program, wherein the processor is used to call and run the computer program stored in the memory to perform the method according to the second aspect or any implementation of the second aspect.

According to a seventh aspect, there is provided a chip configured to perform the method according to any one of the first to second aspects or any implementation of the first to second aspects.

Specifically, the device includes a processor configured to call and run a computer program stored in a memory to cause an apparatus in which the chip is installed to perform the method according to any one of the first to second aspects or any implementation of the first to second aspects.

According to an eighth aspect, there is provided a computer-readable storage medium configured to store a computer program, wherein the computer program is configured to cause a computer to perform the method according to any one of the first to second aspects or any implementation of the first to second aspects.

According to a ninth aspect, there is provided a computer program product including computer program instructions that cause a computer to perform the method according to any one of the first to second aspects or any implementation of the first to second aspects.

According to a tenth aspect, there is provided a computer program. When the computer program is run on a computer, the computer is caused to perform the method according to any one of the first to second aspects or any implementation of the first to second aspects.

Based on the above technical solutions, the terminal device can report the beam failure information of at least one secondary cell to the network device through MAC CE, so that the network device can quickly perform the beam failure recovery for the at least one secondary cell according to the beam failure information of the at least one secondary cell. This is conducive to ensuring the data transmission of the terminal device.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, and so on.

Figure 1:
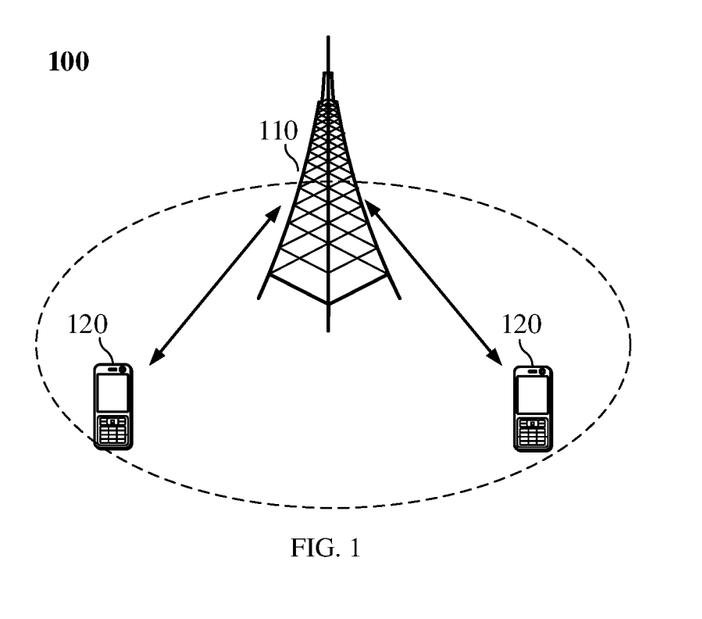
FIG. 1 is a schematic diagram of an application scenario according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area.

According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 further includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to some embodiments, a Device to Device (D2D) communication may be performed between the terminal devices 120.

According to some embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 1 as an example, the communication device may include the network device 110 and the terminal devices 120 having a communication function. The network device 110 and the terminal devices 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

It should be understood that the terms "system" and "network" are often used interchangeably herein. The term "and/or" herein is only an association relationship describing associated objects, which means that there can be three kinds of relationships, for example, A and/or B can mean: A alone, B alone, and A and B together. In addition, the character "/" generally indicates that the associated objects before and after "/" are in an "or" relationship.

Figure 2:
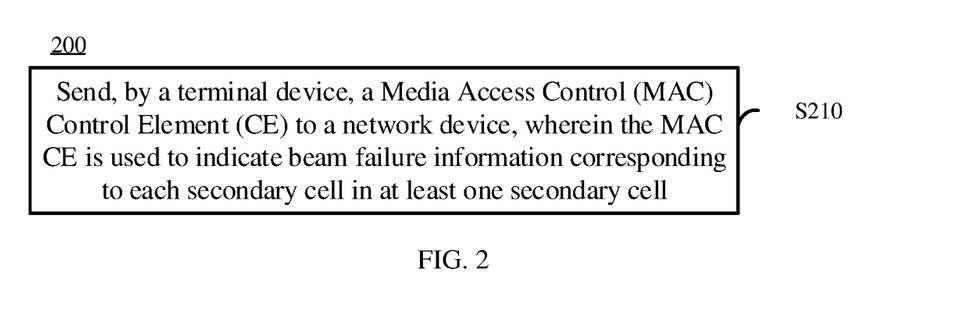
FIG. 2 is a schematic diagram of a wireless communication method according to an embodiment of the present disclosure.

FIG. 2 is a schematic flowchart of a wireless communication method according to an embodiment of the present disclosure.

In S210, a terminal device sends a Media Access Control (MAC) Control Element (CE) to a network device. The MAC CE is used to indicate beam failure information corresponding to each secondary cell in at least one secondary cell.

For the convenience of distinction and illustration, in embodiments of the present disclosure, the Media Access Control Control Element (MAC CE) used to report the beam failure information of the secondary cell is called the beam failure request MAC CE, or secondary-cell beam failure request MAC CE. The beam failure request MAC CE may be a specially defined MAC CE, which is used for reporting the beam failure information of the secondary cell.

In embodiments of the present disclosure, the at least one secondary cell is a secondary cell in which Beam Failure Recovery (BFR) occurs, and the beam failure information corresponding to the secondary cell may include information related to the BFR of the secondary cell. As an example and not a limitation, the beam failure information corresponding to the secondary cell may include at least one of the following:

identity information of the secondary cell;

information of a target reference signal that corresponds to the secondary cell and satisfies a specific condition, wherein the target reference signal is a candidate reference signal which is used for a Beam Failure Recovery (BFR) for the secondary cell and is selected by the terminal device from a candidate reference signal set corresponding to the secondary cell;

information indicating that there is no candidate reference signal for the secondary cell that satisfies the specific condition; and information indicating that no candidate reference signal set for BFR is configured for the secondary cell.

The candidate reference signal set may be configured by the network device, and is used for the terminal device to determine the target reference signal in the candidate reference signal set when BFR occurs in the secondary cell.

For example, the terminal device may perform measurement on candidate reference signals in the candidate reference signal set, determine the signal quality corresponding to the candidate reference signals, and determine a candidate reference signal that meets the specific condition, that is, determine whether beams used to send these candidate reference signals can be used for subsequent data transmission. Further, the terminal device may report information of the determined target reference signal to the network device.

For example, the information of the target reference signal may include the identity of the target reference signal and/or information of the transmission beam corresponding to the target reference signal, such as beam ID, so that the network device switches to the beam corresponding to the target reference signal and uses the beam to perform subsequent data transmission with the terminal device.

According to some embodiments, the specific condition includes that the signal quality of the candidate reference signal is greater than or equal to a specific threshold, or the candidate reference signal is a candidate reference signal with the best signal quality in the candidate reference signal set, and so on, and embodiments of the present disclosure are not limited to this.

In some embodiments, the candidate reference signal set may include one or more candidate reference signals, and the candidate reference signal set may be configured by the network device.

For example, the network device may configure the candidate reference signal set through higher layer signaling, such as Radio Resource Control (RRC) signaling.

For example, an RRC parameter in the RRC signaling may include a candidate beam reference signal list (candidateBeamRSList). The candidate reference signal set may include candidate beam reference signals in the candidateBeamRSList.

It should be understood that the network device may configure a corresponding candidate reference signal set for each secondary cell, or may configure the same candidate reference signal set for all secondary cells, which is not limited in embodiments of the present disclosure.

In other embodiments, the candidate reference signal set may be predefined. For example, a reference signal with a specific identifier may be predefined as a candidate reference signal. For another example, the predefined candidate reference signal set may be specified in a standard.

In some embodiments, the specific threshold is configured by the network device, or the specific threshold may be predefined.

For example, the predefined specific threshold may be specified in a standard.

As an example, the candidate reference signal may be a synchronization signal block (synchronizing signal/PBCH block, SS/PBCH block), or a Channel State Information Reference Signal (CSI-RS), or may be other downlink reference signal.

The information of the target reference signal reported by the terminal device may include the type of the target reference signal and the identity (ID) of the target reference signal, and the type of the target reference signal may be, for example, SSB or CSI-RS.

In some embodiments, when BFR occurs in a secondary cell, the terminal device may send the beam failure request MAC CE to the network device on a special cell (SpCell), or may send the beam failure request MAC CE to the network device on a secondary cell where the BFR does not occur. The device sends the beam failure request MAC CE. The following uses the sending of the beam failure request MAC CE on the SpCell as an example, but the disclosure is not limited to this.

According to some embodiments, the special cell may be a Primary Cell (PCell) or a Primary Secondary cell (PSCell) corresponding to the at least one secondary cell.

In embodiments of the present disclosure, if there is an uplink resource for transmitting the MAC CE on the SpCell, the terminal device sends the MAC CE on the SpCell, or if there is no uplink resource on the SpCell, or the size of the uplink resource is not enough to transmit the MAC CE, the terminal device may first trigger a Scheduling Request (SR) on the SpCell. The following describes possible implementations of SR using Example 1 and Example 2.

Example 1

The SR may be a specially defined SR. For example, the SR may be used to indicate the occurrence of BFR in a secondary cell, or the SR may be used to request an uplink resource for transmitting the MAC CE, that is, the SR may a SR for requesting an uplink resource for reporting the beam failure information. By triggering the specially defined SR, the network device can learn that BFR occurs in the secondary cell or that the terminal device needs to report the beam failure information, and the network device can send an uplink grant (UL grant) as soon as possible. In this way, the terminal device can report the beam failure information as soon as possible, thereby reducing the delay of BFR.

The terminal device may trigger the SR on a pre-configured first resource. According to some embodiments, the first resource may be an uplink resource pre-configured by the network device for sending the SR, or a predefined uplink resource. For example, the first resource may be specified in a standard.

For example, the first resource may be configured for the specially defined SR, that is, the first resource may be used for sending the specially defined SR, or in other words, the first resource may be a dedicated resource for sending the specially defined SR.

For example, if the SR is used to indicate the occurrence of BFR in a secondary cell, or the SR is used to request an uplink resource for transmitting the MAC CE, the dedicated resource may be pre-configured for the specifically defined SR. Further, the dedicated resource may be used to send the SR indicating that BFR occurs in a secondary cell, or the SR used to request the uplink resource for reporting the beam failure information.

Alternatively, it can also be considered that the SR triggered by the pre-configured first resource is a specially defined SR. If the network device receives the SR triggered by the first resource, the network device can determine that the SR is used to indicate that BFR occurs in a secondary cell, or the SR is used to request an uplink resource for transmitting the MAC CE, and the UL grant can be issued as soon as possible. Inn this way, the terminal device can report the beam failure information as soon as possible and the delay of the BFR can be reduced.

For example, the SR may be one bit, and different values of the one bit indicate that the SR is used to indicate that BFR occurs in a secondary cell or is used to request an uplink resource for transmitting the MAC CE.

For example, 0 is used to indicate that the SR is used to indicate that BFR occurs in a secondary cell, and 1 is used to indicate that the SR is used to request an uplink resource for transmitting the beam failure request MAC CE.

For another example, the SR may be one bit, and the SR is used to indicate that BFR occurs in a secondary cell no matter whether the one bit is 0 or 1. If the network device receives the SR triggered by the first resource, the network device can determine that the SR is used to indicate that BFR occurs in a secondary cell.

For another example, the SR may be one bit. Regardless of whether the one bit is 0 or 1, the SR is used to request the uplink resource for transmitting the beam failure request MAC CE. If the network device receives the SR triggered by the first resource, the network device can determine that the SR is used to request the uplink resource for transmitting the beam failure request MAC CE.

In the above embodiments, the number of bits for the SR is only an example, the SR may also be more bits, and the number of bits for the SR may be specifically determined according to the contents indicated by the SR, which is not limited in the embodiments of the present disclosure.

In some embodiments, the terminal device may report the beam failure information of the secondary cell through the SR, or the terminal device may report the beam failure information of the secondary cell through the BSR, or the BSR may be triggered to indicate that BFR occurs in the secondary cell or request an uplink resource for reporting the beam failure information. For specific implementations, refer to the related implementations regarding SR, which will not be repeated here.

Example 2

The SR may be an existing SR. In some cases, when the network device receives the SR, the network device may not allocate an uplink grant (UL grant) or cannot allocate an uplink grant in time. In order to reduce the delay of the BFR, the SR may be sent using SR resource configuration (SchedulingRequestResourceConfig) corresponding to a high-priority logical channel.

For example, the high-priority logical channel may be a Ultra-Reliable and Low Latency Communication (URLLC) logical channel.

Further, if the network device configures an uplink grant for the terminal device in response to the SR sent by the terminal device, the terminal device may send the MAC CE based on the uplink grant.

The transmission manner of the MAC CE will be described below with reference to Embodiment 1 and Embodiment 2.

Embodiment 1: the terminal device transmits the MAC CE through a first message in a random access procedure.

Optionally, the first message may be message 3 (Msg3) in a four-step random access procedure, or may be message A in a two-step random access procedure, and the message A may include message 1 (Msg1) and Msg3 in the four-step random access procedure.

As an example, if there is no uplink resource on the special cell to transmit the MAC CE, or if the uplink resource is insufficient, the terminal device can trigger a random access procedure on the special cell, for example, a contention-based random access (Contention Based RACH) procedure, and the MAC CE is transmitted through the first message in the random access procedure. For example, the terminal device may carry the MAC CE for indicating the beam failure information (i.e., the beam failure request MAC CE) in Msg3. In another implementation, an indication field can be added to the beam failure request MAC CE to indicate the UE ID, so that it is not necessary to carry the MAC CE indicating the UE ID (that is, the Cell Radio Network Temporary Identity (C-RNTI) MAC CE) separately in the Msg3. In other words, the MAC CE used to carry the UE ID and the beam failure request MAC CE can be combined into the same MAC CE, which is beneficial to reduce signaling overhead.

As another example, the terminal device may initiate a random access procedure on the secondary cell where BFR occurs, and send the MAC CE to the network device through an uplink message in the random access procedure.

As another example, regardless of whether there is uplink resource on the special cell, the terminal device may send the MAC CE to the network device through an uplink message in the random access procedure.

For the carrying manner of the MAC CE in the first message during the random access procedure, refer to the specific implementations of the first example, which will not be repeated here.

Embodiment 2: the terminal device sends the MAC CE through a pre-configured second resource.

Optionally, the second resource is an uplink resource pre-configured by the network device for sending the MAC CE.

For example, the network device may configure the second resource through a Configured grant, and the Configured grant may be a dedicated resource configured by the network device for transmitting the beam failure request MAC CE, or the Configured grant may be common, that is, the Configured grant may be used to transmit the beam failure request MAC CE, or can also be used to transmit data.

According to some other embodiments, the second resource may be a resource on a special cell or a resource on a secondary cell. When BFR occurs in a secondary cell, the terminal device may use the second resource on the special cell to send the MAC CE, or the terminal device may use the second resource on another secondary cell where no BFR has occurred to send the MAC CE, which is not limited in the embodiments of the present disclosure.

It should be understood that the Embodiment 1 and Embodiment 2 can be implemented separately or in combination, and embodiments of the present disclosure do not limit this.

For example, the terminal device can initiate a random access procedure on a special cell through a pre-configured second resource, and send the MAC CE through the first cell.

In embodiments of the present disclosure, the beam failure request MAC CE may correspond to a high logical channel priority, which is beneficial to ensure reliable and timely transmission of the beam failure request MAC CE.

In some embodiments, the priorities of the logical channels can be arranged in the following order from high to low:

C-RNTI MAC CE or data in Uplink common control channel (UL-CCCH);

configured grant confirmation MAC CE;

MAC CE used for Buffer Status Report (BSR), except padding BSR;

Single/multiple entry Power Headroom Report (PHR) MAC CE;

data of any logical channel, except data in UL-CCCH;

MAC CE for recommended bit rate query;

MAC CE for padding BSR.

As an example, the logical channel priority of the beam failure request MAC CE is higher than the logical channel priority of data on any logical channel except the uplink common control channel (CCCH), but lower than the logical channel priority of data in UL-CCCH.

As another example, the logical channel priority of the beam failure request MAC CE is only lower than the logical channel priority of the data in the UL-CCCH, that is, the logical channel priority of the beam failure request MAC CE may be ranked between the C-RNTI MAC CE and the configured grant confirmation MAC CE.

As another example, the logical channel priority of the beam failure request MAC CE may be ranked between the configured grant confirmation MAC CE and the MAC CE for the BSR (except the padding BSR).

As another example, the logical channel priority of the beam failure request MAC CE may be ranked between the MAC CE for the BSR (except the padding BSR) and the PHR MAC CE.

In some embodiments of the present disclosure, the terminal device may receive first configuration information from the network device, and the first configuration information is used to configure the at least one secondary cell to support BFR.

For example, the network device may configure the at least one secondary cell to support BFR through RRC signaling.

For example, the RRC signaling may include a list of at least one secondary cell that supports BFR, and the network device may also update the list of secondary cells that support BFR.

According to some embodiments, the network device may implicitly indicate the secondary cell that supports BFR.

For example, if the network device configures a candidate reference signal set for a certain secondary cell, it may indicate that the network device configures the secondary cell to support BFR, that is, the first configuration information is configuration information used to configure the candidate reference signal set for the at least one secondary cell.

Hereinafter, the format design of the MAC CE will be described.

As an embodiment, the MAC CE includes at least one information field, the at least one information field corresponds to the at least one secondary cell where BFR occurs one to one, and each information field in the at least one information field is used to indicate the beam failure information of a corresponding secondary cell.

If there is one secondary cell where BFR occurs, the MAC CE may include one information field for indicating the beam failure information of the one secondary cell; or, if there are multiple secondary cells where BFR occurs, the MAC CE may include multiple information fields which are used to indicate the beam failure information of the multiple secondary cells, respectively. The order of the multiple information fields can be an ascending order or a descending order of secondary cell IDs.

Further, each information field may include a first secondary cell indication field, and the first secondary cell indication field is used to indicate the ID of the secondary cell.

Case 1: if the information field only includes the first secondary cell indication field, the MAC CE is used to indicate that there is no candidate reference signal that meets the specific condition on the corresponding secondary cell, or the secondary cell is not configured with a candidate reference signal set.

Case 2: the information field further includes a reference signal indication field which is used to indicate information of the target reference signal corresponding to the secondary cell, or there is no target reference signal that meets the specific condition on the secondary cell, or the secondary cell is not configured with a candidate reference signal set.

For example, the reference signal indication field includes an indication bit, the indication bit takes a first value (for example, 1) to indicate that there is no target reference signal that meets the specific condition on the secondary cell, and the indication bit takes a second value (for example, 0) to indicate that the secondary cell is not configured with a candidate reference signal set.

According to some embodiments, the candidate reference signal indication field includes a reference signal type field and a reference signal identity field. The reference signal type field is used to indicate that the target reference signal is SSB or CSI-RS, and the reference signal identity field is used to indicate the identity (ID) of the target reference signal.

As an example, the reference signal indication field takes a specific value to indicate that there is no candidate reference signal that meets the specific condition on the secondary cell, or the secondary cell is not configured with a candidate reference signal set.

For example, the reference signal indication field taking a specific value includes: the reference signal type field indicates SSB, and the reference signal identity field indicates an invalid SSB ID.

As another embodiment, the MAC CE includes a second secondary cell indication field and at least one reference signal indication field. The second secondary cell indication field is used to indicate whether BFR occurs in each of the multiple secondary cells. The reference signal indication field is used to indicate at least one of the following:

information about the target reference signal corresponding to the secondary cell where the BFR occurs;

information indicating that the secondary cell where the BFR occurs does not have the target reference signal that meets the specific condition; and information indicating that the secondary cell where the BFR occurs is not configured with a candidate reference signal set for BFR.

According to some embodiments, the second secondary cell indication field is used to indicate a first bitmap, and each bit in the first bitmap corresponds to a secondary cell, and each bit is used to indicate whether BFR occurs in a corresponding secondary cell.

Further, details regarding the format of each reference signal indication field in the at least one reference signal indication field can be found in descriptions regarding the design of the reference signal indication field in the previous embodiment, which will not be repeated here.

Several possible formats of the MAC CE according to embodiments of the present disclosure will be introduced below with reference to FIG. 3 to FIG. 8.

Figure 3:
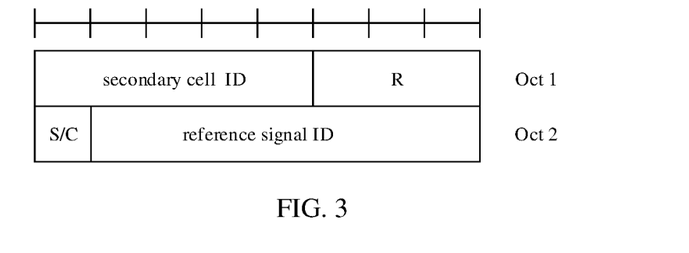
FIG. 3 to FIG. 8 are schematic format diagrams of MAC CE according to embodiments of the present disclosure.

FIG. 3 is a schematic diagram showing a possible format of MAC CE. The MAC CE shown in FIG. 3 may include the following information:

secondary cell ID (SCell ID): used to indicate the identity of the SCell;

R: reserved bit;

reference signal type (S/C): used to indicate whether the reference signal ID carried by the MAC CE is SSB ID or CSI-RS ID.

For example, S/C can be set to 1 for SSB ID, and 0 for CSI-RS ID;

reference signal ID (SSB/CSI-RS ID): used to indicate the identity (ID) of the reference signal, namely SSB ID or CSI-RS ID.

As an example, the secondary cell ID and reserved bit may occupy 1 byte (Oct1).

As another example, the reference signal type may occupy 1 bit, and the reference signal ID may occupy seven bits, that is, the both occupy one byte (Oct2).

According to some embodiments, the maximum number of SSBs is 64, that is, six bits, and the maximum number of CSI-RSs is 128, that is, seven bits.

In the MAC CE shown in FIG. 3, the terminal device may report the ID of the secondary cell where the BFR occurs and the information of the target reference signal selected by the terminal device, and fill the information of the target reference signal in the reference signal type and the reference signal ID. The network device can learn the information of the target reference signal, and can further switch to the new beam corresponding to the target reference signal, and return the beam failure request response to the terminal device, thereby achieving fast BFR.

Figure 4:
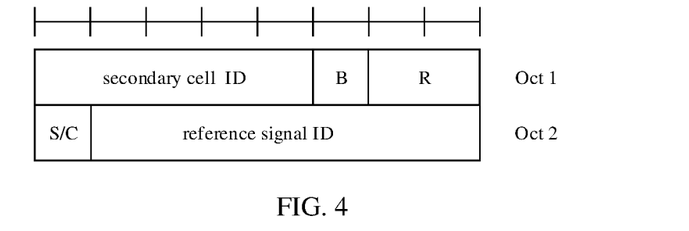

FIG. 4 is a schematic diagram showing another possible format of MAC CE. The MAC CE shown in FIG. 4 may include the following information:

secondary cell ID (SCell ID): used to indicate the identity of the SCell;

R: reserved bit;

indication bit (B): used to indicate information showing that the secondary cell does not have the target reference signal that meets the specific condition or the candidate reference signal set is not configured for the secondary cell. In this case, the indication bit may be one bit.

In some embodiments, the indication bit may also be used to indicate that there is a target reference signal that satisfies a specific condition. In this case, the indication bit may be two bits, and different values of the two bits indicate: the secondary cell has a target reference signal that meets a specific condition, information indicating that the secondary cell does not have a target reference signal that meets a specific condition, or a candidate reference signal set is not configured for the secondary cell.

Reference signal type (S/C): used to indicate whether the reference signal ID carried by the MAC CE is SSB ID or CSI-RS ID.

For example, S/C can be set to 1 for SSB ID, and 0 for CSI-RS ID;

reference signal ID (SSB/CSI-RS ID): used to indicate the identity (ID) of the reference signal, namely SSB ID or CSI-RS ID.

As an example, the secondary cell ID, the indication bit B and the reserved bit may occupy one byte (Oct1).

As an example, the reference signal type may occupy one bit, and the reference signal ID may occupy seven bits, that is, the both occupy a byte 2 (Oct2).

According to some embodiments, the maximum number of SSBs is 64, that is, six bits, and the maximum number of CSI-RSs is 128, that is, seven bits.

According to some embodiments, when the reference signal type and the reference signal ID take a specific value, they may be used to indicate information showing that the secondary cell does not have the target reference signal that meets the specific condition or that a candidate reference signal set is not configured.

For example, the reference signal type is SSB ID, and the maximum number of SSBs is 64. If the SSB ID indicated by the reference signal ID exceeds 64, it is an invalid SSB ID.

For example, the reference signal ID is 1111111. In this case, it can be used to indicate information showing that the secondary cell does not have the target reference signal that meets the specific condition or to indicate that a candidate reference signal set is not configured.

For another example, the reference signal type is SSB ID, and the maximum number of SSBs is 64. If the SSB ID indicated by the reference signal ID exceeds 64, the following SSB ID is invalid. In one implementation, different invalid SSB IDs indicate information showing that the secondary cell has no target reference signal that meets the specific condition or that a candidate reference signal set is not configured.

For example, if the SSB ID is a value within 64-100, it can be used to indicate information showing that the secondary cell does not have the target reference signal that meets the specific condition, or if the SSB ID is a value within 101-127, it can be used to indicate that the secondary cell is not configured with a candidate reference signal set.

Figure 5:
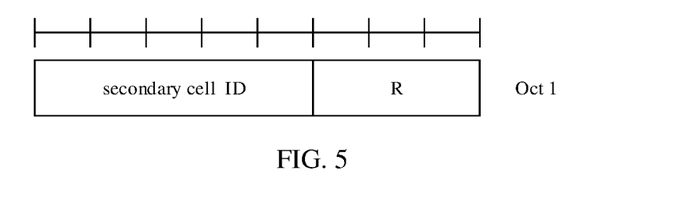

As another example, if the secondary cell does not have information of the target reference signal information that meets the specific condition or a candidate reference signal set is not configured for the secondary cell, the terminal device may also use the MAC CE format shown in FIG. 5 to perform reporting. The MAC CE shown in FIG. 5 may only include the following information:

secondary cell ID (SCell ID): used to indicate the identity of the SCell;

R: reserved bit.

If the network device receives the MAC CE in the format shown in FIG. 5, the network device can determine that the secondary cell does not have information about the target reference signal that meets the specific condition or that the candidate reference signal set is not configured.

Figure 6:
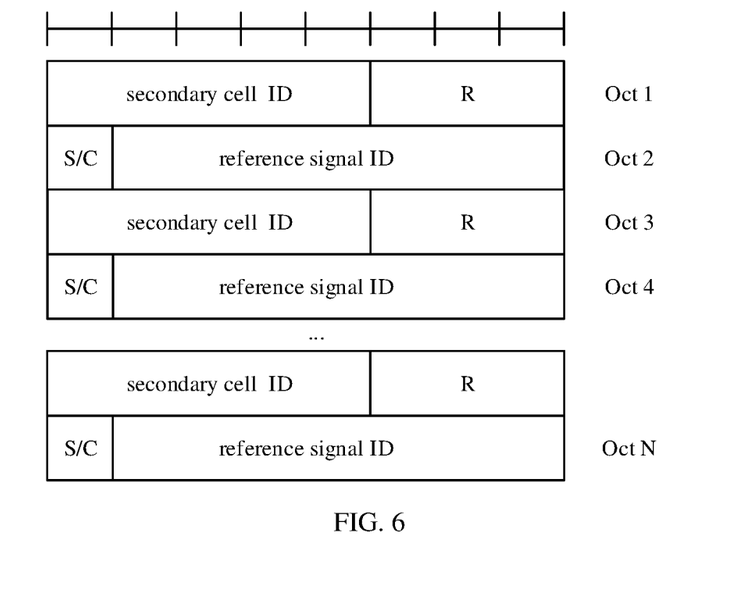

In some embodiments, the terminal device may also report beam failure information of multiple secondary cells. FIG. 6 is a schematic diagram of a format of MAC CE used to report beam failure information of multiple secondary cells.

It should be understood that if the beam failure information corresponding to each secondary cell is regarded as an information field, FIG. 3 to FIG. 5 can be considered as one information field. Therefore, the beam failure information of multiple secondary cells can be realized by using multiple information fields. The multiple information fields can be arranged in the order of values of the secondary cell IDs where the BFR occurs. FIG. 6 only shows an example of reporting beam failure information corresponding to multiple secondary cells in the format shown in FIG. 3. Of course, the format shown in FIG. 4 or FIG. 5 can also be used to report beam failure information corresponding to multiple secondary cells. The specific format can be selected according to the contents of the beam failure information corresponding to the secondary cells, which will not be described in detail here.

In an exemplary example, if the beam failure information of one secondary cell occupies 2 bytes, the MAC CE for the beam failure information of multiple secondary cells occupies N bytes, where N is twice of the number of multiple secondary cells. The beam failure information of the multiple secondary cells can be arranged in the order of the value of the secondary cell IDs, and the network device can learn the beam failure information of the first secondary cell where BFR occurs from the first and second bytes, learn the beam failure information of the second secondary cell where BFR occurs from the third and fourth bytes, and so on.

Figure 7:
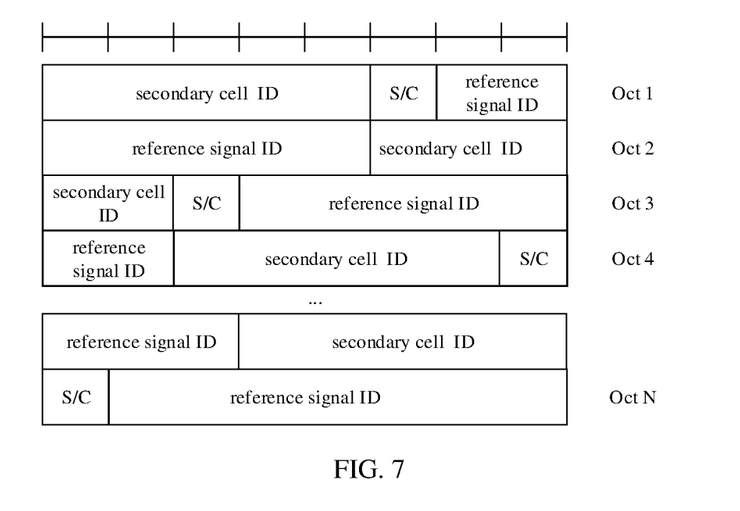

FIG. 7 is a schematic diagram showing another format of MAC CE for reporting beam failure information of multiple secondary cells. The difference between the format of the MAC CE in FIG. 6 and the format of the MAC CE in FIG. 7 is that the reserved bit is omitted, which can further reduce the total length of the MAC CE.

Figure 8:
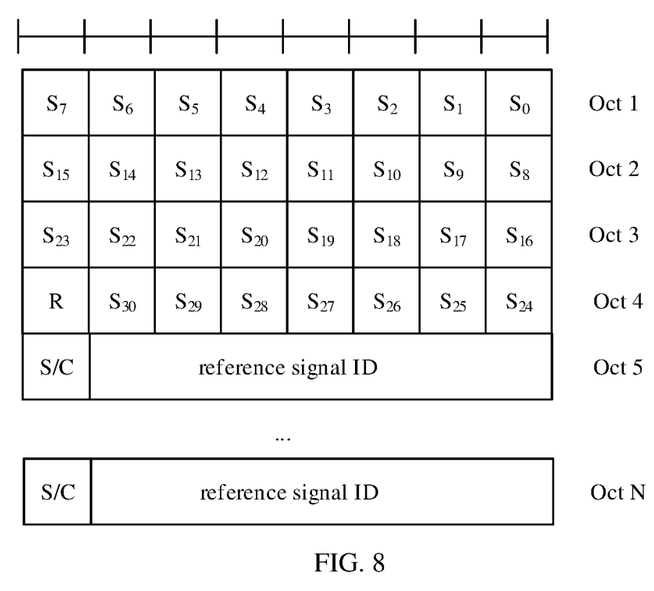

As another example, if it is needed to report beam failure information of multiple secondary cells, the MAC CE format shown in FIG. 8 may be used.

In the MAC CE format shown in FIG. 8, the following information may be included:

Bitmap: used to indicate the secondary cells where BFR occurs in M secondary cells, M is the total number of secondary cells, where one bit in the bitmap corresponds to one secondary cell, and this bit is used to indicate whether BFR occurs in the corresponding secondary cell.

the information of at least one reference signal is used to indicate the information of the reference signal corresponding to the secondary cell where the BFR occurs. For the indication manner of the information of the reference signal corresponding to each secondary cell, please refer to relevant design of the reference signal type, the reference signal ID and the indication bit, and repeated descriptions are omitted here.

In some embodiments, the MAC CE may further include format information, which is used to indicate the format type adopted by the MAC CE, for example, the format shown in FIG. 3, or the format shown in FIG. 4, and so on, so that the network device can correctly parse information according to the corresponding format.

It should be understood that the MAC CE formats shown in FIGS. 3 to 8 are only examples, and the above-mentioned MAC CE formats can also be adjusted, for example, the position or length of the indication field in the MAC CE may be adjusted, a reserved bit may be added, or a reserved bit may be deleted, and so on, and embodiments of the present disclosure do not impose specific limitations on this.

Figure 9:
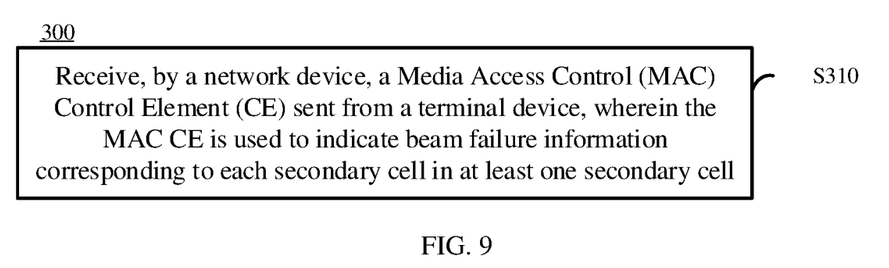
FIG. 9 is a schematic diagram of a wireless communication method according to an embodiment of the present disclosure.

The wireless communication method according to embodiments of the present disclosure are described above in detail from the perspective of the terminal device with reference to FIGS. 2 to 8, and the following describes the wireless communication method according to other embodiments of the present disclosure from the perspective of a network device with reference to FIG. 9. It should be understood that the descriptions on the network device side and the descriptions on the terminal device side correspond to each other, and similar descriptions can be found in the descriptions regarding previous embodiments, and thus repeated descriptions are omitted here.

FIG. 9 is a schematic flowchart of a wireless communication method 300 according to another embodiment of the present disclosure. The method 300 may be performed by a network device in the communication system shown in FIG. 1. As shown in FIG. 9, the method 300 includes the following content:

In S310, the network device receives a Media Access Control (MAC) Control Element (CE) sent from a terminal device. The MAC CE is used to indicate beam failure information corresponding to each secondary cell in at least one secondary cell.

According to some embodiments, the beam failure information corresponding to each secondary cell comprises at least one of the following:

identity information of the secondary cell;

information of a target reference signal that corresponds to the secondary cell and satisfies a specific condition, wherein the target reference signal is a candidate reference signal which is used for a Beam Failure Recovery (BFR) for the secondary cell and is selected by the terminal device from a candidate reference signal set corresponding to the secondary cell;

information indicating that there is no candidate reference signal for the secondary cell that satisfies the specific condition; and information indicating that no candidate reference signal set for BFR is configured for the secondary cell.

According to some embodiments, the specific condition comprises that a signal quality of the candidate reference signal is greater than or equal to a specific threshold.

According to some embodiments, the candidate reference signal set is configured by the network device, and the specific threshold is configured by the network device.

According to some embodiments, the information of the target reference signal comprises a type of the target reference signal and an identity (ID) of the target reference signal, and the type of the target reference signal is a Synchronization Signal Block (SSB) or a Channel State Information Reference Signal (CSI-RS).

According to some embodiments, the method further includes:

receiving, by the network device, a Scheduling Request (SR) which is triggered by the terminal device on a special cell.

According to some embodiments, the SR is used to indicate occurrence of BFR in a secondary cell.

According to some embodiments, the SR is used to request an uplink resource for transmitting the MAC CE.

According to some embodiments, the SR is sent using an SR resource configuration corresponding to a high-priority logical channel.

According to some embodiments, the high-priority logical channel comprises a Ultra-Reliable and Low Latency Communication (URLLC) logical channel.

According to some embodiments, the SR is triggered on pre-configured first resource.

According to some embodiments, the first resource is an uplink resource pre-configured by the network device for sending the SR.

According to some embodiments, the MAC CE is transmitted through a first message in a random access procedure.

According to some embodiments, the MAC CE further comprises a terminal device identity (UE ID).

According to some embodiments, the first message is a message 3.

According to some embodiments, the MAC CE is transmitted through a pre-configured second resource.

According to some embodiments, the second resource is an uplink resource pre-configured by the network device for sending the MAC CE.

According to some embodiments, the method 300 further includes:

sending, by the network device, first configuration information to the terminal device, wherein the first configuration information is used to configure the at least one secondary cell to support BFR.

According to some embodiments, the first configuration information is configuration information for configuring a candidate reference signal set for the at least one secondary cell.

According to some embodiments, a logical channel priority of the MAC CE is higher than a logical channel priority of data on any logical channel except an uplink Common Control Channel (CCCH).

According to some embodiments, the MAC CE is sent on a special cell.

According to some embodiments, the special cell is a primary cell or a primary secondary cell corresponding to the at least one secondary cell.

The method embodiments of the present disclosure are described in detail above with reference to FIGS. 2 to 9, and the device embodiments of the present disclosure will be described in detail below with reference to FIGS. 10 to 13. It should be understood that the device embodiments and the method embodiments correspond to each other and similar descriptions can be found in previous descriptions regarding the method embodiments.

Figure 10:
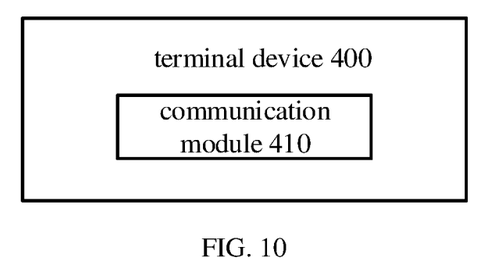
FIG. 10 is a schematic block diagram of a terminal device according to an embodiment of the present disclosure.

FIG. 10 shows a schematic block diagram of a terminal device 400 according to an embodiment of the present disclosure. As shown in FIG. 10, the terminal device 400 includes a communication module 410.

The communication module 420 is configured to send a Media Access Control (MAC) Control Element (CE) to a network device. The MAC CE is used to indicate beam failure information corresponding to each secondary cell in at least one secondary cell.

According to some embodiments, the beam failure information corresponding to each secondary cell comprises at least one of the following:

identity information of the secondary cell;

information of a target reference signal that corresponds to the secondary cell and satisfies a specific condition, wherein the target reference signal is a candidate reference signal which is used for a Beam Failure Recovery (BFR) for the secondary cell and is selected by the terminal device from a candidate reference signal set corresponding to the secondary cell;

information indicating that there is no candidate reference signal for the secondary cell that satisfies the specific condition; and information indicating that no candidate reference signal set for BFR is configured for the secondary cell.

According to some embodiments, the specific condition comprises that a signal quality of the candidate reference signal is greater than or equal to a specific threshold.

According to some embodiments, the candidate reference signal set is configured by the network device, and the specific threshold is configured by the network device.

According to some embodiments, the information of the target reference signal comprises a type of the target reference signal and an identity (ID) of the target reference signal, and the type of the target reference signal is a Synchronization Signal Block (SSB) or a Channel State Information Reference Signal (CSI-RS).

According to some embodiments, the communication module 410 is further configured to:

trigger a Scheduling Request (SR) on a special cell.

According to some embodiments, the SR is used to indicate occurrence of BFR in a secondary cell.

According to some embodiments, the SR is used to request an uplink resource for transmitting the MAC CE.

According to some embodiments, the SR is sent using an SR resource configuration corresponding to a high-priority logical channel.

According to some embodiments, the high-priority logical channel comprises a Ultra-Reliable and Low Latency Communication (URLLC) logical channel.

According to some embodiments, the communication module 410 is configured to:

receive an uplink grant in response to the SR, and send the MAC CE based on the uplink grant.

According to some embodiments, the communication module 410 is further configured to:

trigger the SR on a pre-configured first resource.

According to some embodiments, the first resource is an uplink resource pre-configured by the network device for sending the SR.

According to some embodiments, the communication module 410 is further configured to:

transmit the MAC CE through a first message in a random access procedure.

According to some embodiments, the MAC CE further comprises a terminal device identity (UE ID).

According to some embodiments, the communication module 410 is further configured to:

send the MAC CE through a pre-configured second resource.

According to some embodiments, the second resource is an uplink resource pre-configured by the network device for sending the MAC CE.

According to some embodiments, the communication module 410 is further configured to:

receive first configuration information, wherein the first configuration information is used to configure the at least one secondary cell to support BFR.

According to some embodiments, the first configuration information is configuration information for configuring a candidate reference signal set for the at least one secondary cell.

According to some embodiments, a logical channel priority of the MAC CE is higher than a logical channel priority of data on any logical channel except an uplink Common Control Channel (CCCH).

According to some embodiments, the communication module 410 is further configured to:

send the MAC CE to the network device on a special cell.

According to some embodiments, the special cell is a primary cell or a primary secondary cell corresponding to the at least one secondary cell.

It should be understood that the terminal device 400 may correspond to the terminal device in the method embodiments, and the above and other operations and/or functions of units in the terminal device 400 are used for implementing corresponding processes performed by the terminal device in the method 200 shown in FIG. 2. For the sake of brevity, details are not described here again.

Figure 11:
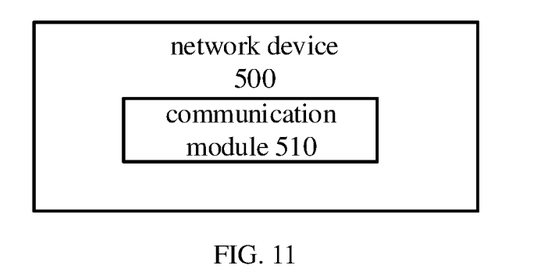
FIG. 11 is a schematic block diagram of a network device according to an embodiment of the present disclosure.

FIG. 11 is a schematic block diagram of a network device according to an embodiment of the present disclosure. The network device 500 in FIG. 11 includes a communication module 510.

The communication module 510 is configured to receive a Media Access Control (MAC) Control Element (CE) sent from a terminal device. The MAC CE is used to indicate beam failure information corresponding to each secondary cell in at least one secondary cell.

According to some embodiments, the beam failure information corresponding to each secondary cell comprises at least one of the following:

identity information of the secondary cell;

information of a target reference signal that corresponds to the secondary cell and satisfies a specific condition, wherein the target reference signal is a candidate reference signal which is used for a Beam Failure Recovery (BFR) for the secondary cell and is selected by the terminal device from a candidate reference signal set corresponding to the secondary cell;

information indicating that there is no candidate reference signal for the secondary cell that satisfies the specific condition; and information indicating that no candidate reference signal set for BFR is configured for the secondary cell.

According to some embodiments, the specific condition comprises that a signal quality of the candidate reference signal is greater than or equal to a specific threshold.

According to some embodiments, the candidate reference signal set is configured by the network device, and the specific threshold is configured by the network device.

According to some embodiments, the information of the target reference signal comprises a type of the target reference signal and an identity (ID) of the target reference signal, and the type of the target reference signal is a Synchronization Signal Block (SSB) or a Channel State Information Reference Signal (CSI-RS).

According to some embodiments, the communication module is further configured to:

receive a Scheduling Request (SR) which is triggered by the terminal device on a special cell.

According to some embodiments, the SR is used to indicate occurrence of BFR in a secondary cell.

According to some embodiments, the SR is used to request an uplink resource for transmitting the MAC CE.

According to some embodiments, the SR is sent using an SR resource configuration corresponding to a high-priority logical channel.

According to some embodiments, the high-priority logical channel comprises a Ultra-Reliable and Low Latency Communication (URLLC) logical channel.

According to some embodiments, the SR is triggered on pre-configured first resource.

According to some embodiments, the first resource is an uplink resource pre-configured by the network device for sending the SR.

According to some embodiments, the MAC CE is transmitted through a first message in a random access procedure.

According to some embodiments, the MAC CE further comprises a terminal device identity (UE ID).

According to some embodiments, the first message is a message 3.

According to some embodiments, the MAC CE is transmitted through a pre-configured second resource.

According to some embodiments, the second resource is an uplink resource pre-configured by the network device for sending the MAC CE.

According to some embodiments, the communication module is further configured to:

send first configuration information to the terminal device, wherein the first configuration information is used to configure the at least one secondary cell to support BFR.

According to some embodiments, the first configuration information is configuration information for configuring a candidate reference signal set for the at least one secondary cell.

According to some embodiments, a logical channel priority of the MAC CE is higher than a logical channel priority of data on any logical channel except an uplink Common Control Channel (CCCH).

According to some embodiments, the MAC CE is sent on a special cell.

According to some embodiments, the special cell is a primary cell or a primary secondary cell corresponding to the at least one secondary cell.

It should be understood that the network device 500 may correspond to the network device in the method embodiments, and the above and other operations and/or functions of units in the network device 500 are used for implementing corresponding processes performed by the network device in the method 300 shown in FIG. 9. For the sake of brevity, details are not described here again.

Figure 12:
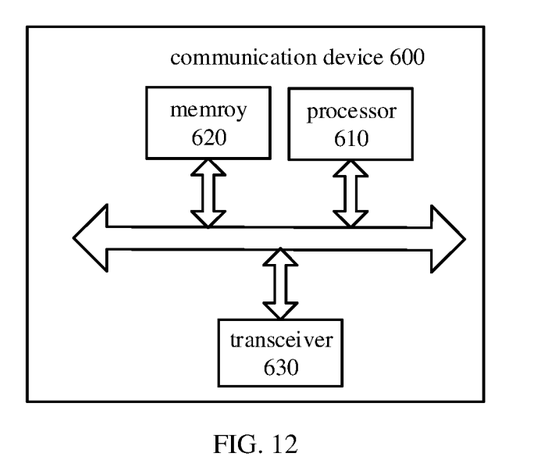
FIG. 12 is a schematic block diagram of a communication device according to another embodiment of the present disclosure.

FIG. 12 is a schematic structural diagram of a communication device 600 according to an embodiment of the present disclosure. The communication device 600 shown in FIG. 12 includes a processor 610, and the processor 610 may call and run a computer program from a memory to perform the method in embodiments of the present disclosure.

According to embodiments, as shown in FIG. 12, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 12, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure.

According to embodiments, the communication device 600 may specifically be the mobile terminal/terminal device in embodiments of the present disclosure, and the communication device 600 may implement the corresponding processes implemented by the mobile terminal/terminal device in the method embodiments of the present disclosure. For brevity, details are not repeated here.

Figure 13:
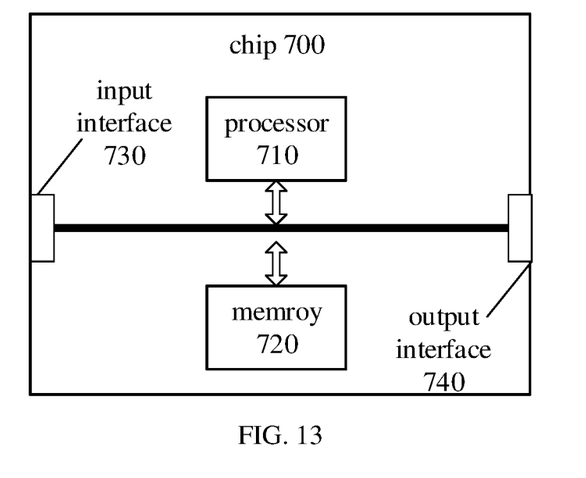
FIG. 13 is a schematic block diagram of a chip according to an embodiment of the present disclosure.

FIG. 13 is a schematic structural diagram of a chip according to an embodiment of the present disclosure. The chip 700 shown in FIG. 13 includes a processor 710, and the processor 710 can call and run a computer program from a memory to implement the method according to embodiments of the present disclosure.

According to embodiments, as shown in FIG. 13, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the device can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways.

For example, the device embodiments described above are merely illustrative.

For example, the division of the units is only a kind of logical function division. In practice, other division manner may be used.

For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
    sending, by a terminal device, a Media Access Control (MAC) Control Element (CE) to a network device through a Msg3 in a four-step random access procedure, wherein the MAC CE is used to indicate beam failure information corresponding to each secondary cell in at least one secondary cell;
    wherein the method further comprises:
    triggering, by the terminal device, a Scheduling Request (SR),
    wherein triggering, by the terminal device, the SR, comprises: triggering, by the terminal device, the SR on a pre-configured first resource;
    wherein the SR is used to request an uplink resource for transmitting the MAC CE;
    wherein the beam failure information corresponding to each secondary cell comprises at least one of the following:
    identity information of the secondary cell;
    information of a target reference signal that corresponds to the secondary cell and satisfies a specific condition, wherein the target reference signal is a candidate reference signal which is used for a Beam Failure Recovery (BFR) for the secondary cell and is selected by the terminal device from a candidate reference signal set corresponding to the secondary cell; or
    information indicating that there is no candidate reference signal for the secondary cell that satisfies the specific condition;
    wherein the information of the target reference signal comprises a type of the target reference signal and an identity (ID) of the target reference signal, and the type of the target reference signal is a Synchronization Signal Block (SSB) or a Channel State Information Reference Signal (CSI-RS), wherein a filed is provided in the MAC CE to indicate the type of the target reference signal, the field is set to 1 for an SSB ID, and the field is set to 0 for a CSI-RS ID;

wherein a logical channel priority of the MAC CE for indicating beam failure information corresponding to each secondary cell in at least one secondary cell is higher than a logical channel priority of data on any logical channel except an uplink Common Control Channel (CCCH).

2. The method according to claim 1, wherein the specific condition comprises that a signal quality of the candidate reference signal is greater than or equal to a specific threshold.

3. The method according to claim 2, wherein the candidate reference signal set is configured by the network device, and the specific threshold is configured by the network device.

4. The method according to claim 1, wherein the first resource is an uplink resource pre-configured by the network device for sending the SR.

5. The method according to claim 1, further comprising: receiving, by the terminal device, first configuration information, wherein the first configuration information is used to configure the at least one secondary cell to support BFR.

6. The method according to claim 5, wherein the first configuration information is configuration information for configuring a candidate reference signal set for the at least one secondary cell.

7. The method according to claim 1, wherein sending, by the terminal device, the MAC CE to the network device comprises:
sending, by the terminal device, the MAC CE to the network device on a special cell.

8. The method according to claim 7, wherein the special cell is a primary cell or a primary secondary cell corresponding to the at least one secondary cell.

9. The method according to claim 1, wherein the MAC CE is sent through a configured grant.

10. The method according to claim 9, wherein the configured grant is a dedicated resource configured by the network device for transmitting the MAC CE, or the configured grant is a common resource.

11. A terminal device, comprising one or more processors, memory storing a plurality of programs that, when executed by the one or more processors, cause the terminal device to:
send a Media Access Control (MAC) Control Element (CE) to a network device through a Msg3 in a four-step random access procedure, wherein the MAC CE is used to indicate beam failure information corresponding to each secondary cell in at least one secondary cell;

wherein when the plurality of programs are executed by the one or more processors, the terminal device is caused to:

trigger a Scheduling Request (SR), wherein triggering the SR, comprises: triggering the SR on a pre-configured first resource;

wherein the SR is used to request an uplink resource for transmitting the MAC CE;

wherein the beam failure information corresponding to each secondary cell comprises at least one of the following:

identity information of the secondary cell;

information of a target reference signal that corresponds to the secondary cell and satisfies a specific condition, wherein the target reference signal is a candidate reference signal which is used for a Beam Failure Recovery (BFR) for the secondary cell and is selected by the terminal device from a candidate reference signal set corresponding to the secondary cell; or information indicating that there is no candidate reference signal for the secondary cell that satisfies the specific condition;

wherein the information of the target reference signal comprises a type of the target reference signal and an identity (ID) of the target reference signal, and the type of the target reference signal is a Synchronization Signal Block (SSB) or a Channel State Information Reference Signal (CSI-RS), wherein a filed is provided in the MAC CE to indicate the type of the target reference signal, the field is set to 1 for an SSB ID, and the field is set to 0 for a CSI-RS ID;

wherein a logical channel priority of the MAC CE for indicating beam failure information corresponding to each secondary cell in at least one secondary cell is higher than a logical channel priority of data on any logical channel except an uplink Common Control Channel (CCCH).

12. The terminal device according to claim 11, wherein the specific condition comprises that a signal quality of the candidate reference signal is greater than or equal to a specific threshold.

13. The terminal device according to claim 11, wherein the MAC CE is sent through a configured grant.

14. The terminal device according to claim 13, wherein the configured grant is a dedicated resource configured by the network device for transmitting the MAC CE, or the configured grant is a common resource.

* * * * *